US011228979B2

(12) United States Patent
Jose et al.

(10) Patent No.: US 11,228,979 B2
(45) Date of Patent: Jan. 18, 2022

(54) METHOD AND APPARATUS FOR REDUCING POWER CONSUMPTION WITH WAKE-UP MECHANISM IN MOBILE COMMUNICATIONS

(71) Applicant: MediaTek Singapore Pte. Ltd., Singapore (SG)

(72) Inventors: Pradeep Jose, Cambridge (GB); Abdelkader Medles, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 1 day.

(21) Appl. No.: 16/575,778

(22) Filed: Sep. 19, 2019

(65) Prior Publication Data

US 2020/0100183 A1    Mar. 26, 2020

Related U.S. Application Data

(60) Provisional application No. 62/733,674, filed on Sep. 20, 2018, provisional application No. 62/747,166, filed on Oct. 18, 2018.

(51) Int. Cl.
*H04W 52/02* (2009.01)
*H04W 76/28* (2018.01)
(Continued)

(52) U.S. Cl.
CPC ....... *H04W 52/0235* (2013.01); *H04L 5/0048* (2013.01); *H04W 72/042* (2013.01); *H04W 76/28* (2018.02)

(58) Field of Classification Search
CPC ........... H04W 52/0235; H04W 76/048; H04W 52/0216; H04W 72/0406; H04W 88/08;
(Continued)

(56) References Cited

U.S. PATENT DOCUMENTS 9,872,252 B1 *   1/2018   Ang ................ H04W 52/0229
2007/0091817 A1 *   4/2007   Yoon ..................... H04L 47/263
370/252

(Continued)

FOREIGN PATENT DOCUMENTS

CN   104812032 A   7/2015
CN   107969028 A   4/2018

OTHER PUBLICATIONS

China National Intellectual Property Administration, International Search Report and Written Opinion for PCT/CN2019/106968, dated Dec. 20, 2019.
(Continued)

*Primary Examiner* — Jung Liu
(74) *Attorney, Agent, or Firm* — Han IP PLLC; Andy M. Han (57) ABSTRACT

Various solutions for reducing power consumption with wake-up mechanism with respect to user equipment and network apparatus in mobile communications are described. An apparatus may receive a configuration to monitor a wake-up indication (WUI) on predetermined occasions. The apparatus may monitor the WUI according to the configuration. The apparatus may determine whether the WUI is received. The apparatus may monitor a physical downlink control channel (PDCCH) in an event that the WUI is received.

16 Claims, 8 Drawing Sheets

(51) Int. Cl.
*H04L 5/00* (2006.01)
*H04W 72/04* (2009.01)

(58) Field of Classification Search
CPC . H04W 88/02; H04W 76/28; H04W 52/0229; H04W 52/0258; H04W 28/0284; H04W 52/226; H04W 52/0254; H04W 52/0225; Y02D 30/70
See application file for complete search history.

(56) References Cited

U.S. PATENT DOCUMENTS

| | | | |
|---|---|---|---|
| 2010/0099358 A1 | 4/2010 | Kumar et al. | |
| 2012/0275364 A1 | 11/2012 | Anderson et al. | |
| 2013/0114485 A1* | 5/2013 | Vannithamby | H04W 28/06 370/311 |
| 2013/0301501 A1* | 11/2013 | Olvera-Hernandez | H04W 52/0216 370/311 |
| 2013/0315092 A1 | 11/2013 | Yu et al. | |
| 2014/0112221 A1* | 4/2014 | Verger | H04W 76/28 370/311 |
| 2015/0250017 A1* | 9/2015 | Ingale | H04W 72/042 370/280 |
| 2017/0251518 A1* | 8/2017 | Agiwal | H04W 76/28 |
| 2018/0014347 A1* | 1/2018 | Nagasaka | H04W 8/22 |
| 2018/0020502 A1* | 1/2018 | Fujishiro | H04W 72/042 |
| 2018/0049271 A1* | 2/2018 | Bagheri | H04L 27/2601 |
| 2018/0098287 A1* | 4/2018 | Ang | H04W 76/28 |
| 2018/0145800 A1* | 5/2018 | Srivastav | H04W 52/0229 |
| 2018/0220372 A1* | 8/2018 | Homchaudhuri | H04W 52/226 |
| 2018/0324847 A1* | 11/2018 | Lunden | H04W 76/28 |
| 2019/0053162 A1* | 2/2019 | Islam | H04W 52/0229 |
| 2019/0053321 A1* | 2/2019 | Islam | H04B 7/0639 |
| 2019/0090299 A1* | 3/2019 | Ang | H04L 5/003 |
| 2019/0116585 A1* | 4/2019 | Chakraborty | H04W 72/042 |
| 2019/0254110 A1* | 8/2019 | He | H04L 5/0048 |
| 2019/0261287 A1* | 8/2019 | Deenoo | H04W 24/08 |
| 2019/0297577 A1* | 9/2019 | Lin | H04W 52/0229 |

OTHER PUBLICATIONS

Taiwan Intellectual Property Office, Office Action for Taiwan Patent Application No. 108133941, dated Jul. 30, 2020.
Huawei et al., Gap determination in wake-up signal, 3GPP TSG-RAN WG2 Meeting #103, R2-1811817, Gothenburg, Sweden, Aug. 20-24, 2018.

* cited by examiner

METHOD AND APPARATUS FOR REDUCING POWER CONSUMPTION WITH WAKE-UP MECHANISM IN MOBILE COMMUNICATIONS

CROSS REFERENCE TO RELATED PATENT APPLICATION(S)

The present disclosure is part of a non-provisional application claiming the priority benefit of U.S. Patent Application No. 62/733,674, filed on 20 Sep. 2018, and U.S. Patent Application No. 62/747,166, filed 18 Oct. 2018, the contents of which are incorporated by reference in its entirety.

TECHNICAL FIELD

The present disclosure is generally related to mobile communications and, more particularly, to reducing power consumption with wake-up mechanism with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), for a user equipment (UE) in the connected mode, data exchange with the network is expected to be sporadic. The UE will spend most of its time only for monitoring the physical downlink control channel (PDCCH). Even for data intensive activities such as video streaming, with improvements in data rates in NR, it is expected that the video data is buffered fairly quickly, and the UE drops into a state of data inactivity during which only PDCCH monitoring takes place. Such state will cause unnecessary power consumption and is not beneficial for UE power management.

The discontinuous reception (DRX) mechanism in NR that is inherited from Long-Term Evolution (LTE), requires the UE to only intermittently monitor PDCCH, allowing the UE to transit to sleep in the interval. However, the level of power savings that can be achieved with DRX is down to the network configuration. The percentage of time in a DRX cycle that a UE needs to stay awake for, directly corresponds to the power savings possible. The monitoring window of the DRX mechanism (e.g., DRX on duration) can be quite long (e.g., ≥10 ms) which causes the UE to burn power for downlink monitoring. The UE power consumption is unable to be properly controlled if the network configuration is not well designed.

Accordingly, in addition to the conventional DRX mechanism, how to further reduce UE power consumption becomes an important issue for the newly developed wireless communication network. Therefore, it is needed to provide better schemes to properly monitor radio channels with enhanced power management mechanisms.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to reducing power consumption with wake-up mechanism with respect to user equipment and network apparatus in mobile communications.

In one aspect, a method may involve an apparatus receiving a configuration to monitor a wake-up indication (WUI) on predetermined occasions. The method may also involve the apparatus monitoring the WUI according to the configuration. The method may further involve the apparatus determining whether the WUI is received. The method may further involve the apparatus monitoring a PDCCH in an event that the WUI is received.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising receiving, via the transceiver, a configuration to monitor a WUI on predetermined occasions. The processor may also perform operations comprising monitoring the WUI according to the configuration. The processor may further perform operations comprising determining whether the WUI is received. The processor may further perform operations comprising monitoring, via the transceiver, a PDCCH in an event that the WUI is received.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to reducing power consumption with wake-up mechanism with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, for a UE in the connected mode, data exchange with the network is expected to be sporadic. The UE will spend most of its time only for monitoring the PDCCH. Even for data intensive activities such as video streaming, with improvements in data rates in NR, it is expected that the video data is buffered fairly quickly, and the UE drops into a state of data inactivity during which only PDCCH monitoring takes place. Such state will cause unnecessary power consumption and is not beneficial for UE power management.

Figure 1:
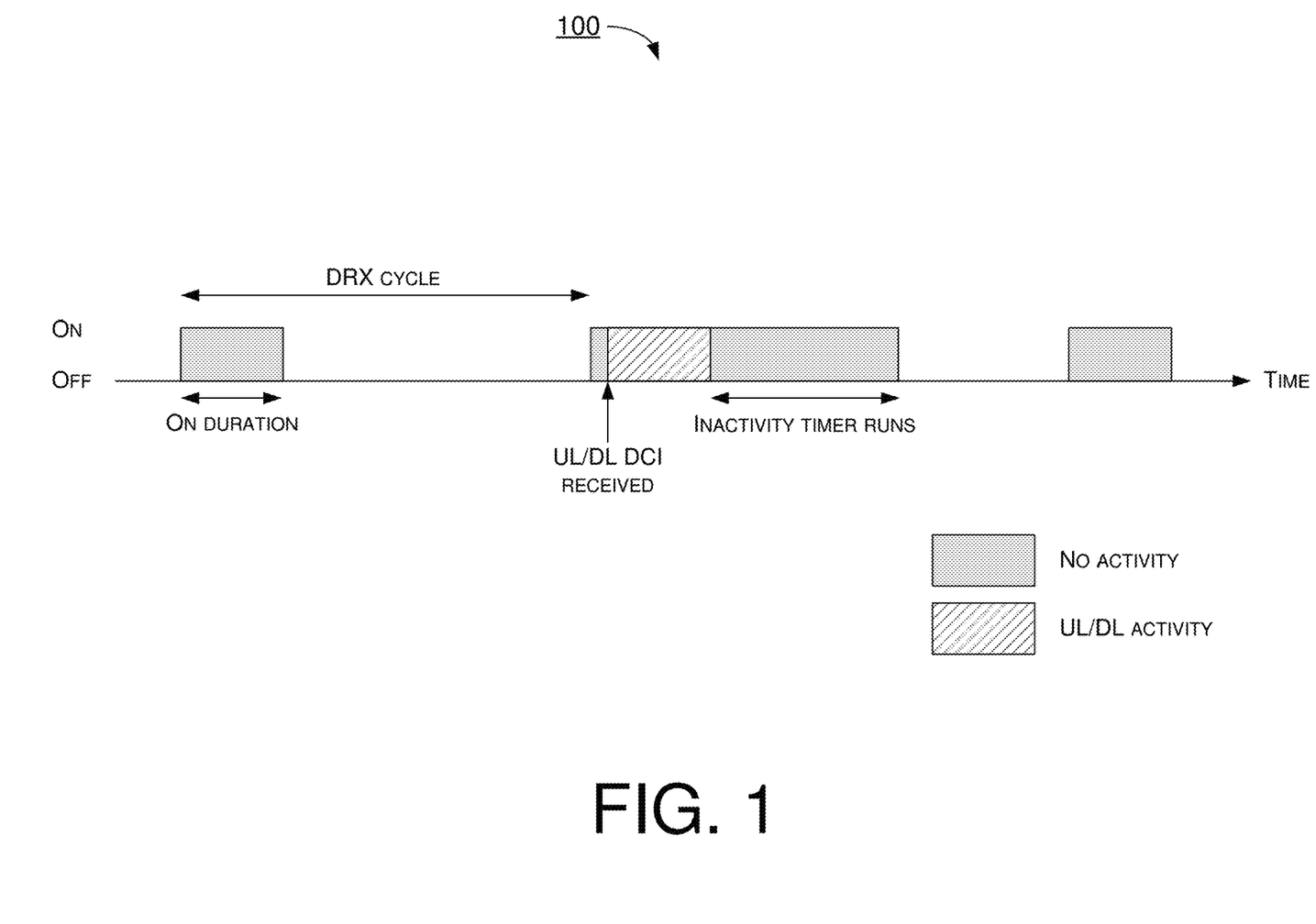
FIG. 1 is a diagram depicting an example scenario under schemes in accordance with implementations of the present disclosure.

The DRX mechanism in NR that is inherited from LTE, requires the UE to only intermittently monitor PDCCH, allowing the UE to transit to sleep in the interval. FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network, a 5G network, an NR network, an IoT network or an NB-IoT network). The DRX on duration defines a period of time every DRX cycle that the UE monitors for potential activity. On the occurrence of activity during the on duration (e.g., the reception of a DCI scheduling uplink (UL) and/or downlink (DL) activities), the DRX inactivity timer is triggered. The DRX inactivity timer restarts each time data is exchanged between the UE and the network, keeping the UE awake while data exchange takes place. On the expiry of the inactivity timer, the UE goes back to sleep. The UE will monitor for activity again in the following on duration.

However, the level of power savings that can be achieved with DRX is down to the network configuration. The percentage of time in a DRX cycle that a UE needs to stay awake for, directly corresponds to the power savings possible. The monitoring window of the DRX mechanism (e.g., DRX on duration) can be quite long (e.g., 10 ms) which causes the UE to burn power for downlink monitoring. The UE power consumption is unable to be properly controlled if the network configuration is not well designed.

In view of the above, the present disclosure proposes a number of schemes pertaining to reducing power consumption with wake-up mechanism with respect to the UE and the network apparatus. According to the schemes of the present disclosure, a wake-up mechanism is used to indicate to a UE to expect activity. The UE may be configured to monitor the DL for the wake-up indication (WUI) on predetermined occasions. Upon receiving a WUI, the UE may monitor a configured search space for DL/UL grants. In addition to monitoring PDCCH for activity, the on duration of the DRX mechanism further provides a window during which link maintenance can be performed. If the on duration is dropped since it is replaced by the wake-up mechanism, the background link maintenance can no longer be performed. Therefore, when the wake-up mechanism is configured, a background activity (BA) window should be further defined during which background link maintenance can be performed.

Specifically, the UE may be configured to receive a configuration to monitor a WUI on predetermined occasions. The UE may be configured to monitor the WUI on predetermined occasions according to the configuration. The UE may determine whether the WUI is received. In an event that the WUI is received, the UE may be configured to monitor a PDCCH for further activity. In an event that the WUI is not received, the UE may be configured to not monitor or to cancel further monitoring of PDCCH for activity.

Figure 2:
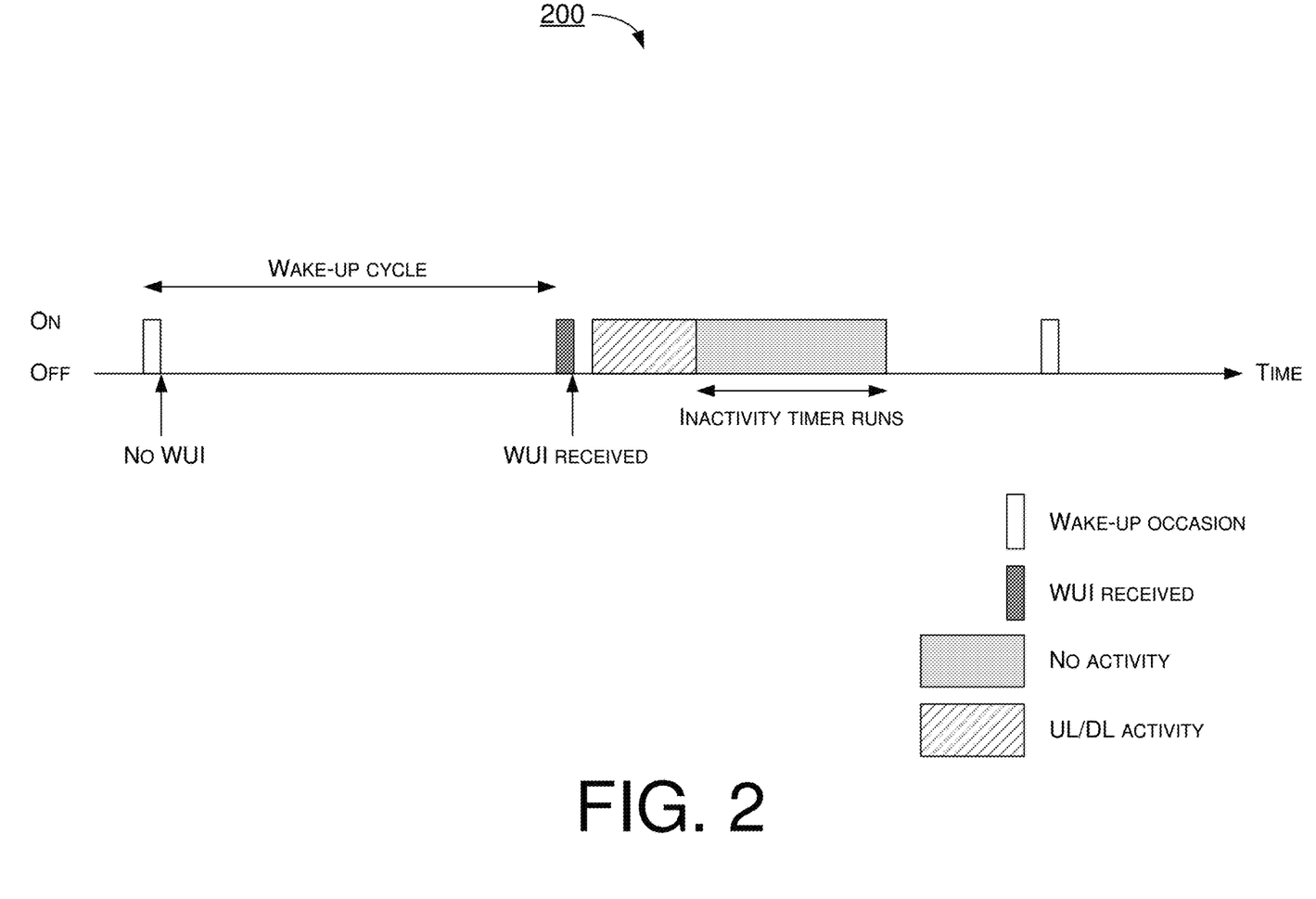
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network node, which may be a part of a wireless communication network (e.g., an LTE network, an LTE-Advanced network, an LTE-Advanced Pro network, a 5G network, an NR network, an IoT network or an NB-IoT network). Scenario 200 illustrates the wake-up mechanism proposed in the present disclosure. The UE may receive a configuration to monitor the WUI from the network node. The configuration may comprise a higher layer configuration (e.g., radio resource control (RRC) configuration) and/or a physical layer configuration. The configuration may configure a plurality of wake-up occasions with a wake-up cycle to the UE. The UE may need to wake up from a low power state or power saving mode to monitor the WUI in the wake-up occasions. The UE may be configured to determine whether the WUI is present in the wake-up occasions. In an event that the WUI is not presented/received, the UE may be configured to enter into a power saving mode to reduce power consumption and wake up again at the next wake-up occasion. In an event that the WUI is presented/received, the UE may be configured to wake up for possible UL/DL activities.

For example, after determining that the WUI is received, the UE may be configured to initiate an inactivity timer. The WUI may be used to indicate to the UE that there are UL/DL activities. The UE may be configured to monitor the PDCCH while the inactivity timer is running. The trigger of the inactivity timer can now be linked to the WUI rather than the PDCCH activity. For example, the WUI may trigger the UE to start the inactivity timer right away. Alternatively, the WUI may trigger the UE to start the inactivity timer after a delay. Alternatively, the WUI may trigger the UE to start the inactivity timer on the next PDCCH monitoring occasion. The PDCCH monitoring may take place when the inactivity timer is running. In an event that there is UL/DL data transfer scheduled by the PDCCH, the UE may be configured to extend the inactivity timer for transmitting/receiving the UL/DL data. When the inactivity timer is expired, the UE may be configured to enter into the power saving mode. When the next wake-up occasion comes, the UE may wake up again to monitor the WUI. Thus, the monitoring of PDCCH occasions for DL/UL data transfer may be subject to a trigger such as the reception of a WUI, or an inactivity timer or any other triggers.

Accordingly, the wake-up mechanism is an indication sent to the UE for it to expect data exchange to take place. When no data exchange is expected, the UE can enter into a low power state in which it only monitors for the reception of the WUI at predetermined occasions. When traffic is sporadic, such mechanism may replace the need of the UE to monitor PDCCH continuously. Instead, the UE may briefly monitor the downlink for the WUI, allowing the UE to go back into sleep (e.g., power saving mode) right away in an event that no WUI is received. The WUI may be sent by the network to alert the UE to the presence of activity. When combined with the DRX mechanism, the WUI may replace the need for the DRX on duration, as the indication plays a similar role to the reception of a DCI during the DRX on duration, triggering the UE to start monitoring PDCCH. The UE may no longer need to monitor PDCCH for the presence of activity during the DRX on duration.

In some implementations, the WUI may comprise at least one of the following: a UE-specific physical signal, a group-common physical signal, a UE-specific DCI, and a group-common DCI. Alternative, the WUI may also comprise a third type signal, or may be carried in any other signals. The wake-up occasion may be shorter than the DRX on duration. For example, a DCI may be received over a duration of 1-3 symbols (e.g., orthogonal frequency-division multiplexing (OFDM) symbols) which is much shorter than the DRX on duration (e.g., ≥10 ms). Thus, the use of the wake-up mechanism may lead to significant power saving when compared to the DRX mechanism.

In addition to the PDCCH monitoring, the UE may need to perform a set of background link maintenance activities. The network may monitor the channel quality via the link maintenance activities. These activities may comprise, for example and without limitation, the periodic/semi-persistent channel state information (CSI) reference signal acquisition, CSI reporting, sound reference signal (SRS) transmission, beam management (BM) measurement and reporting, radio link monitoring (RLM), and radio resource management (RRM). These activities may help maintain a good quality link between the UE and the network node, and these activities may need to be carried out periodically. Therefore, when the wake-up mechanism is configured, a background activity (BA) window during which background link maintenance can be performed may need to be further defined.

Figure 3:
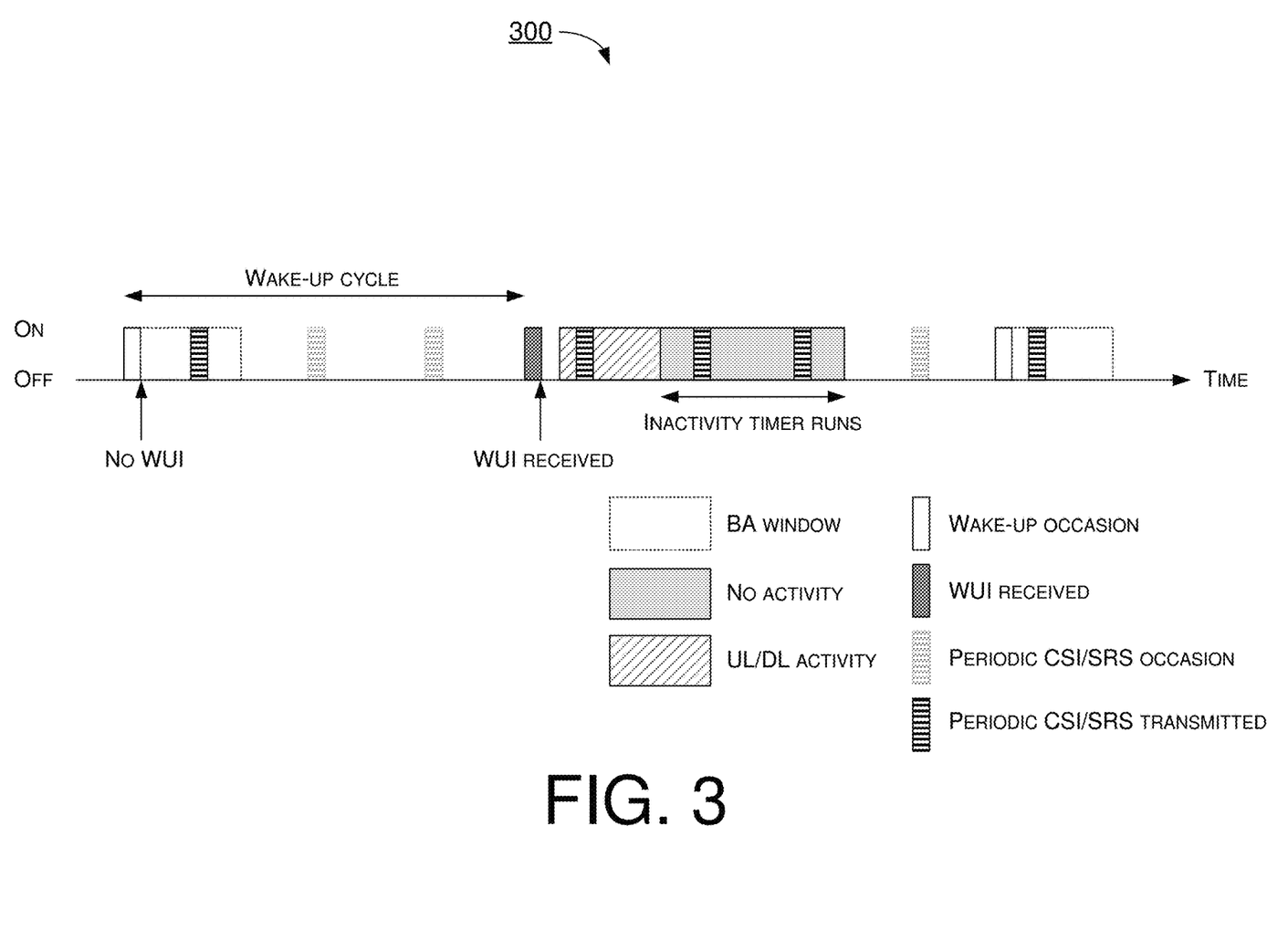
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network node, which may be a part of a wireless communication network (e.g., an LTE network, an LTE-Advanced network, an LTE-Advanced Pro network, a 5G network, an NR network, an IoT network or an NB-IoT network). In scenario 300, some BA windows may be configured to the UE. The BA windows may be configured as periodic time window with a BA window cycle, or the BA window may be dynamically configured. For example, a BA window cycle may be the same period or multiples of a DRX cycle period. In one embodiment, the BA window can be collocated with the synchronization signal block (SSB)-based radio resource management (RRM) measurement time configuration (SMTC) RRM configuration or with the tracking reference signal (TRS) in order to reduce power further. During the BA window, the UE may be configured to wake up to perform the background link maintenance activities. For example, the UE may be configured to transmit the CSI report and/or SRS transmission within the BA window. The UE may be configured to monitor a reduced subset of the configured search spaces, control resource sets (CORESETs) or DCI formats during the BA window. After the BA window, the UE may enter into the power saving mode again to reduce power consumption until next wake-up occasion or next BA window.

The UE may be configured to perform the link maintenance activities periodically or frequently. When the wake-up mechanism and the BA window are configured, only those transmission occasions (e.g. CSI transmission or SRS transmission) that fall within the BA window are allowed to be performed by the UE. The UE may be configured to skip the uplink transmission occasions outside of the BA window. Only those reference signals (e.g. CSI-RS, or synchronization signal block (SSB), or both CSI-RS and SSB) that fall within the BA window are considered as valid by the UE. The UE may be configured to ignore the downlink reference signals outside of the BA window. Accordingly, the background link maintenance activities may not need to be linked to PDCCH monitoring occasions.

In some implementations, the BA window may comprise the DRX on duration. The network node and the UE may use the DRX on duration as the BA window. When the DRX mechanism is configured, the UE may use the DRX on duration to perform the background link maintenance activities. In some implementations, the BA window may comprise a newly defined time window. The network node may configure a specific or additional time window as the BA window. The UE may perform the background link maintenance activities during the newly defined time window.

Figure 4:
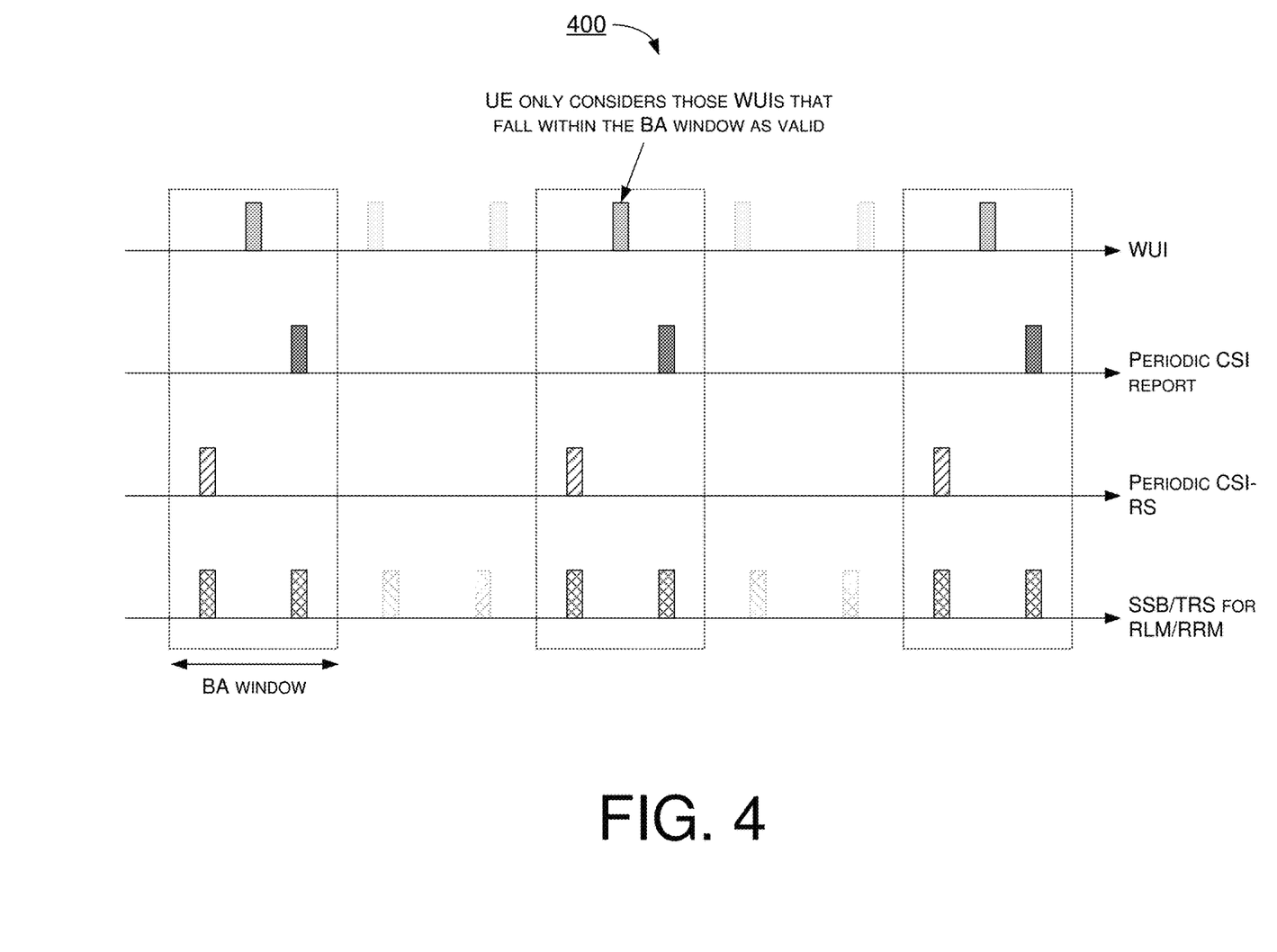
FIG. 4 is a diagram depicting an example scenario under schemes in accordance with implementations of the present disclosure.

In some implementations, the WUI and the BA window may be combined in various ways to improve UE power efficiency. A subset of WUIs that align with or around the BA window may be considered as valid. The subset of WUIs may be used for limited levels of monitoring and reducing power consumption. Alternatively, all WUIs may be considered as valid. FIG. 4 illustrates an example scenario 400 under schemes in accordance with implementations of the present disclosure. Scenario 400 involves a UE and a network node, which may be a part of a wireless communication network (e.g., an LTE network, an LTE-Advanced network, an LTE-Advanced Pro network, a 5G network, an NR network, an IoT network or an NB-IoT network). Scenario 400 illustrates the configured periodicity of the WUI, CSI report, CSI-RS, and SSB/TRS. The UE may be configured with the BA window. As shown in FIG. 4, some WUIs may be located within the BA window. The other WUIs may be located outside of the BA window. The UE may be configured to wake up and monitor the WUI during the BA window. The UE may consider those WUIs that fall within the BA window as valid. The UE may ignore or skip the WUIs that fall out of the BA window. The UE may stay in the power saving mode except for the BA window. Similarly, the UE may consider those reference signals (e.g., CSI-RS/SSB/TRS) that fall within the BA window as valid. The UE may ignore or skip the reference signals that fall out of the BA window. The UE may perform the CSI/SRS transmission during the BA window. The UE may cancel the CSI/SRS transmission out of the BA window.

Figure 5:
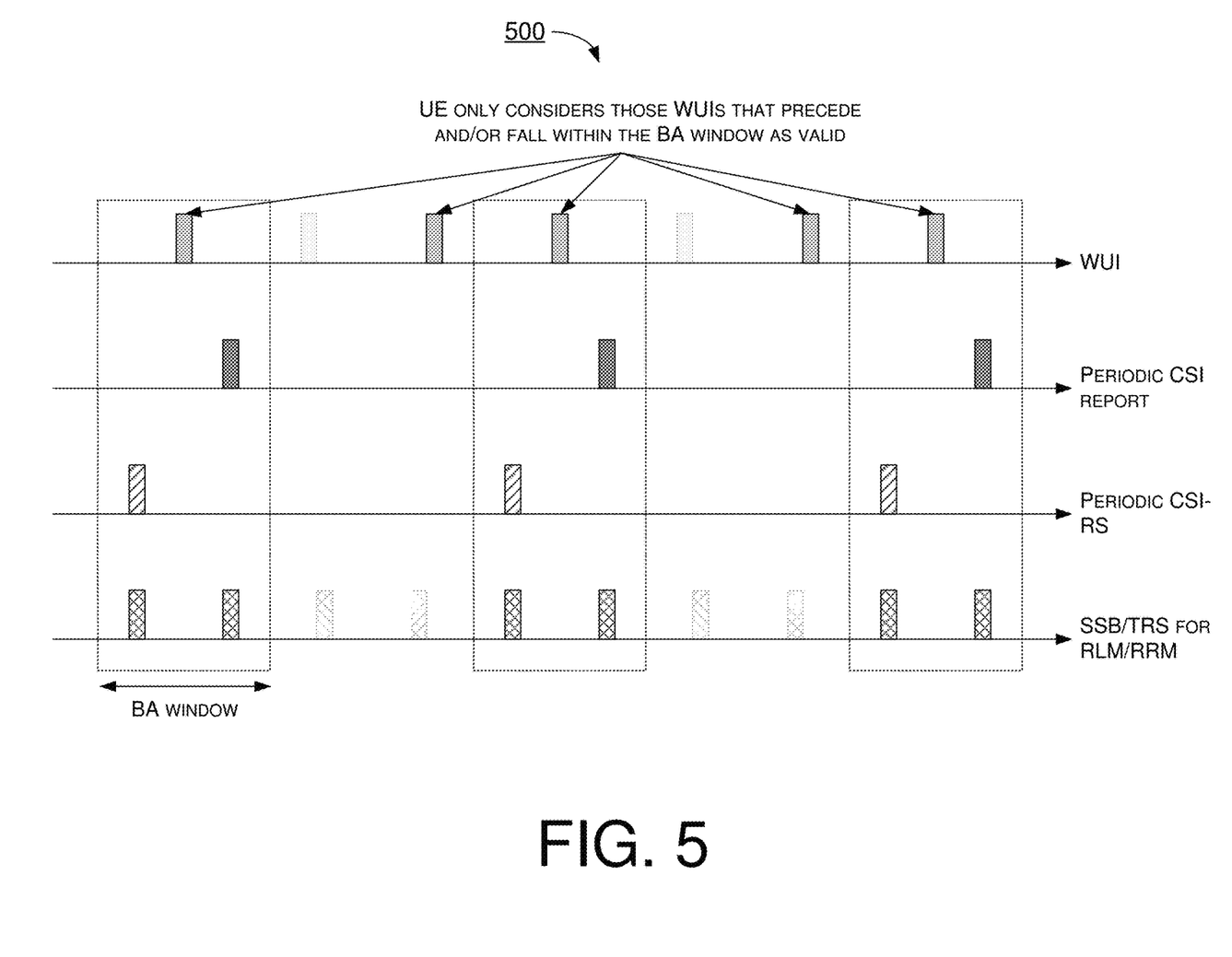
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves a UE and a network node, which may be a part of a wireless communication network (e.g., an LTE network, an LTE-Advanced network, an LTE-Advanced Pro network, a 5G network, an NR network, an IoT network or an NB-IoT network). Similarly, scenario 500 illustrates the configured periodicity of the WUI, CSI report, CSI-RS, and SSB/TRS. The UE may be configured with the BA window. As shown in FIG. 5, the UE may consider the WUIs that precede and/or fall within the BA window as valid. The UE may ignore or skip the other WUIs. The UE may still ignore/skip the reference signals and cancel the CSI/SRS transmission out of the BA window.

Figure 6:
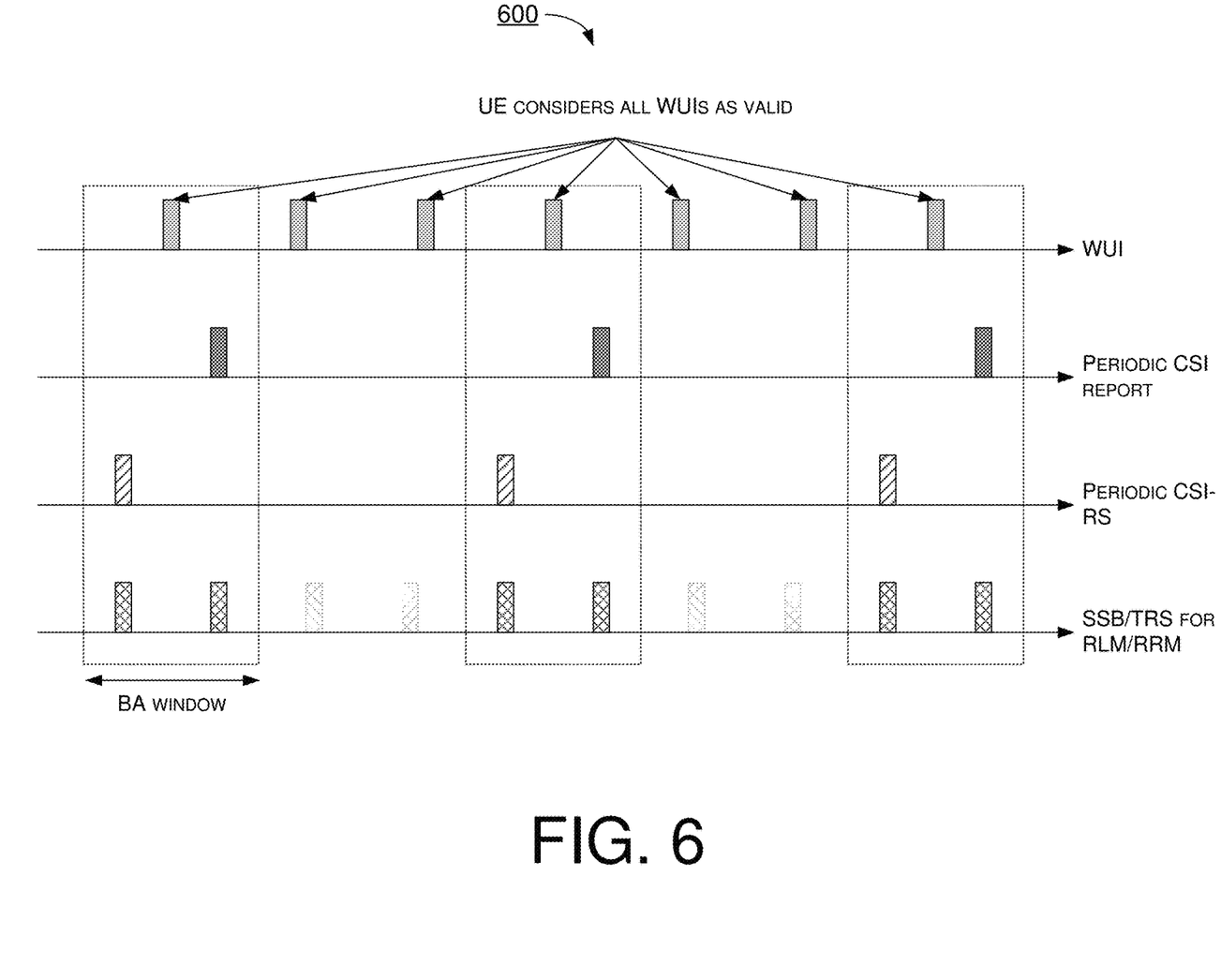
FIG. 6 is a diagram depicting an example scenario under schemes in accordance with implementations of the present disclosure.

FIG. 6 illustrates an example scenario 600 under schemes in accordance with implementations of the present disclosure. Scenario 600 involves a UE and a network node, which may be a part of a wireless communication network (e.g., an LTE network, an LTE-Advanced network, an LTE-Advanced Pro network, a 5G network, an NR network, an IoT network or an NB-IoT network). Similarly, scenario 600 illustrates the configured periodicity of the WUI, CSI report, CSI-RS, and SSB/TRS. The UE may be configured with the BA window. As shown in FIG. 6, the UE may consider all WUIs as valid. The UE may be configured to wake up to monitor each WUI occasion. The UE may still ignore/skip the reference signals and cancel the CSI/SRS transmission out of the BA window.

Illustrative Implementations

Figure 7:
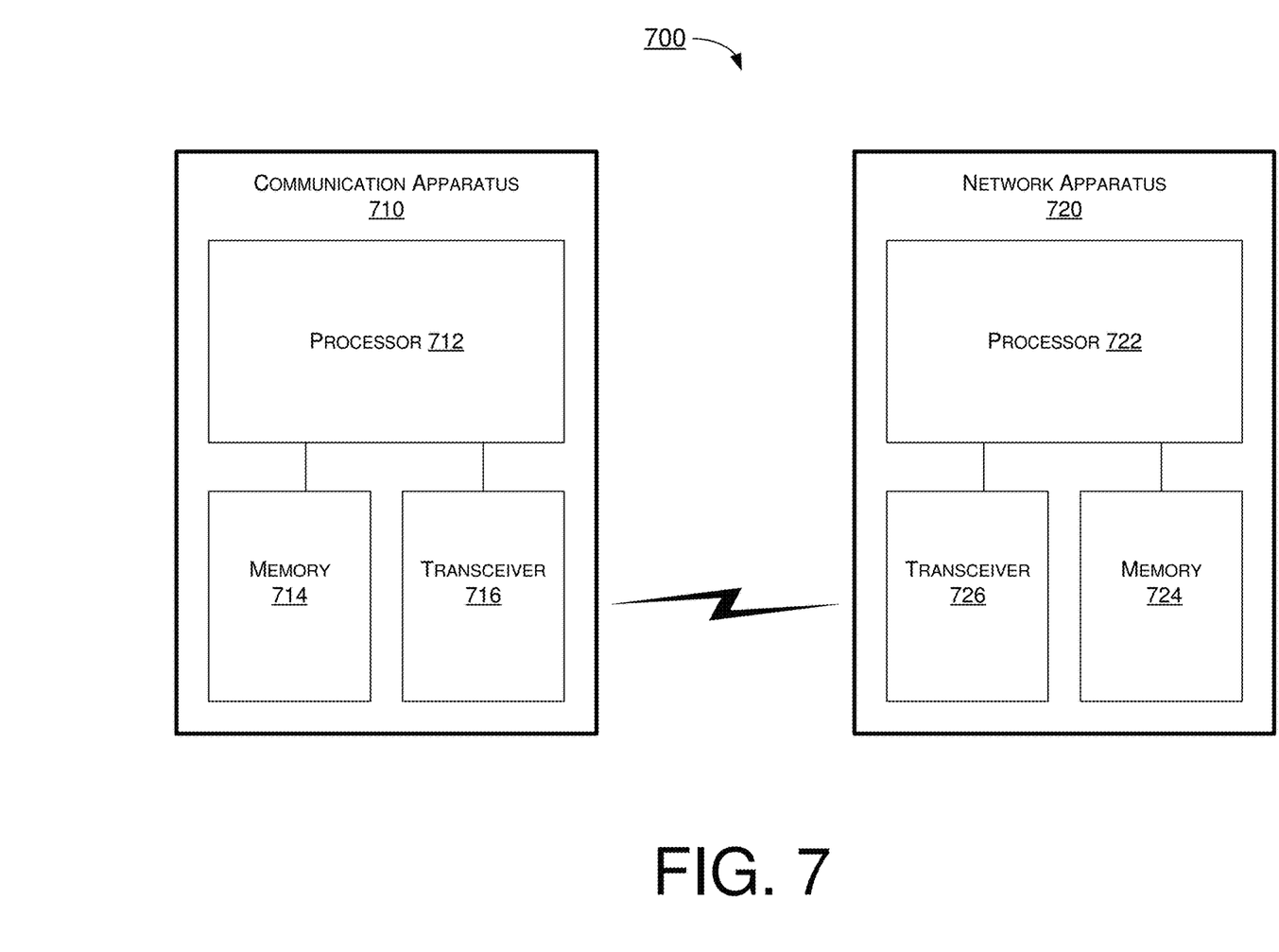
FIG. 7 is a block diagram of an example communication apparatus and an example network apparatus in accordance with an implementation of the present disclosure.
Figure 8:
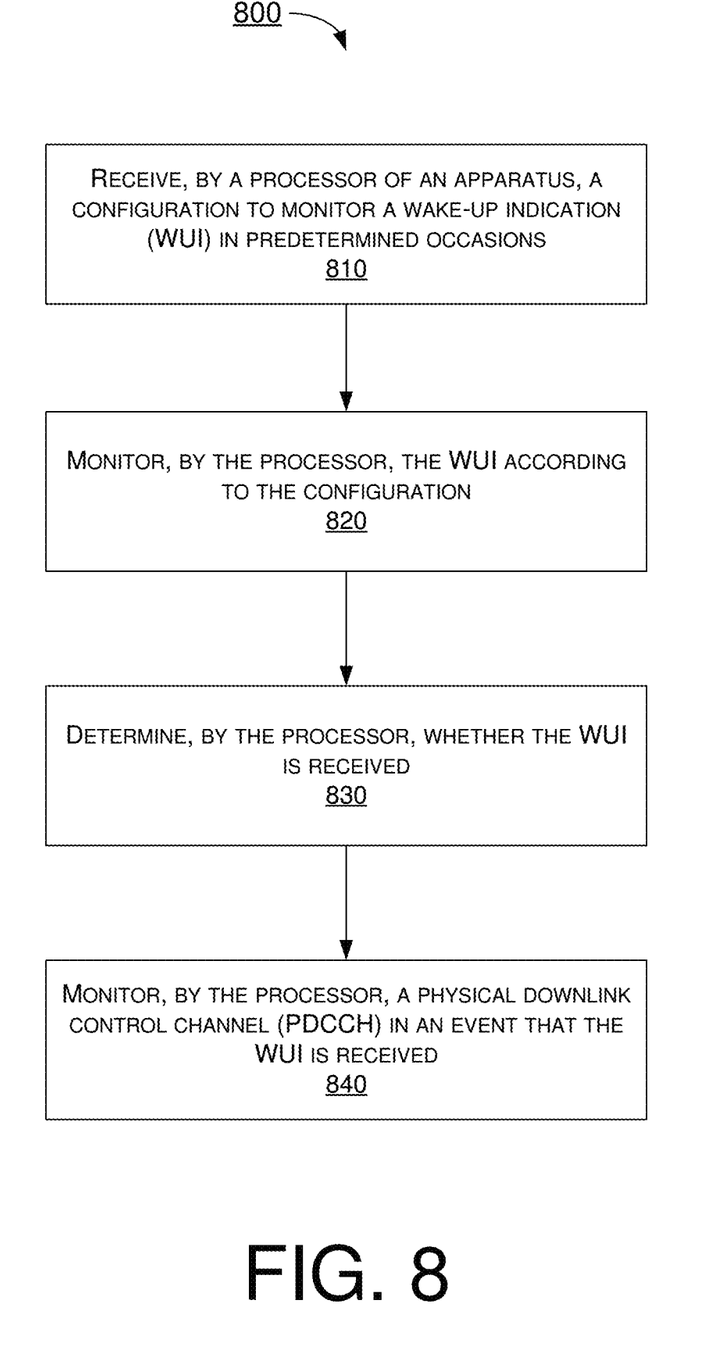
FIG. 8 is a flowchart of an example process in accordance with an implementation of the present disclosure.

FIG. 7 illustrates an example communication apparatus 710 and an example network apparatus 720 in accordance with an implementation of the present disclosure. Each of communication apparatus 710 and network apparatus 720 may perform various functions to implement schemes, techniques, processes and methods described herein pertaining to reducing power consumption with wake-up mechanism with respect to user equipment and network apparatus in wireless communications, including scenarios/schemes described above as well as process 800 described below.

Communication apparatus 710 may be a part of an electronic apparatus, which may be a UE such as a portable or mobile apparatus, a wearable apparatus, a wireless communication apparatus or a computing apparatus. For instance, communication apparatus 710 may be implemented in a smartphone, a smartwatch, a personal digital assistant, a digital camera, or a computing equipment such as a tablet computer, a laptop computer or a notebook computer. Communication apparatus 710 may also be a part of a machine type apparatus, which may be an IoT or NB-IoT apparatus such as an immobile or a stationary apparatus, a home apparatus, a wire communication apparatus or a computing apparatus. For instance, communication apparatus 710 may be implemented in a smart thermostat, a smart fridge, a smart door lock, a wireless speaker or a home control center. Alternatively, communication apparatus 710 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 710 may include at least some of those components shown in FIG. 7 such as a processor 712, for example. Communication apparatus 710 may further include one or more other components not pertinent to the proposed scheme of the present disclosure (e.g., internal power supply, display device and/or user interface device), and, thus, such component(s) of communication apparatus 710 are neither shown in FIG. 7 nor described below in the interest of simplicity and brevity.

Network apparatus 720 may be a part of an electronic apparatus, which may be a network node such as a base station, a small cell, a router or a gateway. For instance, network apparatus 720 may be implemented in an eNodeB in an LTE, LTE-Advanced or LTE-Advanced Pro network or in a gNB in a 5G, NR, IoT or NB-IoT network. Alternatively, network apparatus 720 may be implemented in the form of one or more IC chips such as, for example and without limitation, one or more single-core processors, one or more multi-core processors, or one or more RISC or CISC processors. Network apparatus 720 may include at least some of those components shown in FIG. 7 such as a processor 722, for example. Network apparatus 720 may further include one or more other components not pertinent to the proposed scheme of the present disclosure (e.g., internal power supply, display device and/or user interface device), and, thus, such component(s) of network apparatus 720 are neither shown in FIG. 7 nor described below in the interest of simplicity and brevity.

In one aspect, each of processor 712 and processor 722 may be implemented in the form of one or more single-core processors, one or more multi-core processors, or one or more CISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including power consumption reduction in a device (e.g., as represented by communication apparatus 710) and a network (e.g., as represented by network apparatus 720) in accordance with various implementations of the present disclosure.

In some implementations, communication apparatus 710 may also include a transceiver 716 coupled to processor 712 and capable of wirelessly transmitting and receiving data. In some implementations, communication apparatus 710 may further include a memory 714 coupled to processor 712 and capable of being accessed by processor 712 and storing data therein. In some implementations, network apparatus 720 may also include a transceiver 726 coupled to processor 722 and capable of wirelessly transmitting and receiving data. In some implementations, network apparatus 720 may further include a memory 724 coupled to processor 722 and capable of being accessed by processor 722 and storing data therein. Accordingly, communication apparatus 710 and network apparatus 720 may wirelessly communicate with each other via transceiver 716 and transceiver 726, respectively. To aid better understanding, the following description of the operations, functionalities and capabilities of each of communication apparatus 710 and network apparatus 720 is provided in the context of a mobile communication environment in which communication apparatus 710 is implemented in or as a communication apparatus or a UE and network apparatus 720 is implemented in or as a network node of a communication network.

In some implementations, processor 712 may be configured to receive, via transceiver 716, a configuration to monitor a WUI on predetermined occasions. Processor 712 may be configured to monitor, via transceiver 716, the WUI on predetermined occasions according to the configuration. Processor 712 may determine whether the WUI is received. In an event that the WUI is received, processor 712 may be configured to monitor a PDCCH for further activity. In an event that the WUI is not received, processor 712 may be configured to not monitor or to cancel further monitoring of PDCCH for activity.

In some implementations, processor 712 may receive, via transceiver 716, a configuration to monitor the WUI from network apparatus 720. Processor 722 may transmit, via transceiver 726, the configuration via a higher layer configuration (e.g., RRC configuration) and/or a physical layer configuration. Processor 722 may configure a plurality of wake-up occasions with a wake-up cycle to communication apparatus 710. Processor 712 may need to wake up from a low power state or power saving mode to monitor the WUI in the wake-up occasions. Processor 712 may be configured to determine whether the WUI is present in the wake-up occasions. In an event that the WUI is not presented/received, processor 712 may be configured to enter into a power saving mode to reduce power consumption and wake up again at the next wake-up occasion. In an event that the WUI is presented/received, processor 712 may be configured to wake up for possible UL/DL activities.

In some implementations, after determining that the WUI is received, processor 712 may be configured to initiate an inactivity timer. Processor 722 may use the WUI to indicate to communication apparatus 710 that there are UL/DL activities. Processor 712 may be configured to monitor, via transceiver 716, the PDCCH while the inactivity timer is running.

In some implementations, the WUI may trigger processor 712 to start the inactivity timer right away. Alternatively, the WUI may trigger processor 712 to start the inactivity timer after a delay. Alternatively, the WUI may trigger processor 712 to start the inactivity timer on the next PDCCH monitoring occasion. Processor 712 may perform the PDCCH monitoring when the inactivity timer is running.

In some implementations, in an event that there is UL/DL data transfer scheduled by the PDCCH, processor 712 may be configured to extend the inactivity timer for transmitting/receiving the UL/DL data. When the inactivity timer is expired, processor 712 may be configured to enter into the power saving mode. When the next wake-up occasion comes, processor 712 may wake up again to monitor the WUI. Processor 712 may be triggered to monitor PDCCH occasions by the reception of a WUI, or an inactivity timer or any other triggers.

In some implementations, the wake-up mechanism is an indication sent to communication apparatus 710 for it to expect data exchange to take place. When no data exchange is expected, processor 712 can enter into a low power state in which it only monitors for the reception of the WUI at predetermined occasions. When traffic is sporadic, such mechanism may replace the need of communication apparatus 710 to monitor PDCCH continuously. Instead, communication apparatus 710 may briefly monitor the downlink for the WUI, allowing communication apparatus 710 to go back into sleep (e.g., power saving mode) right away in an event that no WUI is received. The WUI may be sent by network apparatus 720 to alert communication apparatus 710 to the presence of activity. When combined with the DRX mechanism, the WUI may replace the need for the DRX on duration, as the indication plays a similar role to the reception of a DCI during the DRX on duration, triggering communication apparatus 710 to start monitoring PDCCH. Communication apparatus 710 may no longer need to monitor PDCCH for the presence of activity during the DRX on duration.

In some implementations, processor 712 may need to perform a set of background link maintenance activities. Network apparatus 720 may monitor the channel quality via the link maintenance activities. These activities may help maintain a good quality link between communication apparatus 710 and network apparatus 720, and these activities may need to be carried out periodically. Therefore, when the wake-up mechanism is configured, network apparatus 720 may further configure a BA window during which background link maintenance can be performed.

In some implementations, network apparatus 720 may configure some BA windows to the communication apparatus 710. Processor 722 may configure the BA windows as periodic time window with a BA window cycle, or processor 722 may dynamically configure the BA windows. During the BA window, processor 712 may be configured to wake up to perform the background link maintenance activities. For example, processor 712 may be configured to transmit, via transceiver 716, the CSI report and/or SRS transmission within the BA window. Processor 712 may be configured to monitor, via transceiver 716, a reduced subset of the configured search spaces, CORESETs or DCI formats during the BA window. After the BA window, processor 712 may enter into the power saving mode again to reduce power consumption until next wake-up occasion or next BA window.

In some implementations, processor 712 may be configured to perform the link maintenance activities periodically or frequently. When the wake-up mechanism and the BA window are configured, only those transmission occasions (e.g. CSI transmission or SRS transmission) that fall within the BA window are allowed to be performed by processor 712. Processor 712 may be configured to skip the uplink transmission occasions outside of the BA window. Only those reference signals (e.g. CSI-RS, or SSB, or both CSI-RS and SSB) that fall within the BA window are considered as valid by processor 712. Processor 712 may be configured to ignore the downlink reference signals outside of the BA window.

In some implementations, processor 712 and 722 may use the DRX on duration as the BA window. When the DRX mechanism is configured, processor 712 may use the DRX on duration to perform the background link maintenance activities. In some implementations, the BA window may comprise a newly defined time window. Processor 722 may configure a specific or additional time window as the BA window. Processor 712 may perform the background link maintenance activities during the newly defined time window.

In some implementations, processor 712 may be configured with a plurality of BA windows. Some WUIs may be located within the BA window. The other WUIs may be located outside of the BA window. Processor 712 may be configured to wake up and monitor the WUI during the BA window. Processor 712 may consider those WUIs that fall within the BA window as valid. Processor 712 may ignore or skip the WUIs that fall out of the BA window. Processor 712 may stay in the power saving mode except for the BA window. Similarly, processor 712 may consider those reference signals (e.g., CSI-RS/SSB/TRS) that fall within the BA window as valid. Processor 712 may ignore or skip the reference signals that fall out of the BA window. Processor 712 may perform, via transceiver 716, the CSI/SRS transmission during the BA window. Processor 712 may cancel the CSI/SRS transmission out of the BA window.

In some implementations, processor 712 may be configured with a plurality of the BA windows. Processor 712 may consider the WUIs that precede and/or fall within the BA window as valid. Processor 712 may ignore or skip the other WUIs. Processor 712 may still ignore/skip the reference signals and cancel the CSI/SRS transmission out of the BA window.

In some implementations, processor 712 may be configured with a plurality of the BA windows. Processor 712 may consider all WUIs as valid. Processor 712 may be configured to wake up to monitor each WUI occasion. Processor 712 may still ignore/skip the reference signals and cancel the CSI/SRS transmission out of the BA window.

Illustrative Processes

FIG. 8 illustrates an example process 800 in accordance with an implementation of the present disclosure. Process 800 may be an example implementation of above scenarios/schemes, whether partially or completely, with respect to reducing power consumption with wake-up mechanism with the present disclosure. Process 800 may represent an aspect of implementation of features of communication apparatus 710. Process 800 may include one or more operations, actions, or functions as illustrated by one or more of blocks 810, 820, 830 and 840. Although illustrated as discrete blocks, various blocks of process 800 may be divided into additional blocks, combined into fewer blocks, or eliminated, depending on the desired implementation. Moreover, the blocks of process 800 may executed in the order shown in FIG. 8 or, alternatively, in a different order. Process 800 may be implemented by communication apparatus 710 or any suitable UE or machine type devices. Solely for illustrative purposes and without limitation, process 800 is described below in the context of communication apparatus 710. Process 800 may begin at block 810.

At 810, process 800 may involve processor 712 of apparatus 710 receiving a configuration to monitor a WUI on predetermined occasions. Process 800 may proceed from 810 to 820.

At 820, process 800 may involve processor 712 monitoring the WUI according to the configuration. Process 800 may proceed from 820 to 830.

At 830, process 800 may involve processor 712 determining whether the WUI is received. Process 800 may proceed from 830 to 840.

At 840, process 800 may involve processor 712 monitoring a PDCCH in an event that the WUI is received.

In some implementations, the WUI may comprise at least one of a UE-specific physical signal, a group-common physical signal, a UE-specific DCI, and a group-common DCI.

In some implementations, process 800 may involve processor 712 initiating an inactivity timer in an event that the WUI is received. Process 800 may further involve processor 712 monitoring the PDCCH when the inactivity timer is running.

In some implementations, process 800 may involve processor 712 cancelling monitoring the PDCCH in an event that the WUI is not received.

In some implementations, process 800 may involve processor 712 entering into a power saving mode except for the predetermined occasions in an event that the WUI is not received.

In some implementations, process 800 may involve processor 712 determining a BA window. Process 800 may further involve processor 712 performing a link maintenance activity during the BA window.

In some implementations, the link maintenance activity may comprise at least one of a CSI reference signal acquisition, CSI reporting, an SRS transmission, a beam management measurement, beam management reporting, an RLM, an RRM, and monitoring a subset of configured search spaces, control resource sets (CORESETs), or downlink control information (DCI) formats on the PDCCH.

In some implementations, the BA window may comprise a DRX on duration.

In some implementations, process 800 may involve processor 712 considering the WUI within the BA window as valid. Process 800 may further involve processor 712 monitoring the WUI within the BA window.

In some implementations, process 800 may involve processor 712 considering the WUI precedent to the BA window as valid. Process 800 may further involve processor 712 monitoring the WUI precedent to the BA window.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, a configuration to monitor a wake-up indication (WUI) on predetermined occasions, the configuration also configuring a background activity (BA) window during which background link maintenance is performed by the apparatus;
   monitoring, by the processor, the WUI according to the configuration;
   determining, by the processor, whether the WUI is received;
   monitoring, by the processor, a physical downlink control channel (PDCCH) in an event that the WUI is received; and
   performing, by the processor, a link maintenance activity during the BA window;
   wherein the link maintenance activity comprises at least one of a channel state information (CSI) reference signal acquisition, CSI reporting, a sounding reference signal (SRS) transmission, a beam management measurement, beam management reporting, a radio link monitoring (RLM), a radio resource management (RRM), and monitoring a subset of configured search spaces, control resource sets (CORESETs), or downlink control information (DCI) formats on the PDCCH.

2. The method of claim 1, wherein the WUI comprises at least one of a user equipment (UE)-specific physical signal, a group-common physical signal, a UE-specific downlink control information (DCI), and a group-common DCI.

3. The method of claim 1, wherein the BA window is collocated with a synchronization signal block (SSB)-based radio resource management (RRM) measurement time configuration (SMTC) RRM configuration or with the tracking reference signal (TRS) in order to reduce power consumption by the apparatus.

4. The method of claim 1, further comprising:
   cancelling, by the processor, the monitoring of the PDCCH in an event that the WUI is not received.

5. The method of claim 1, further comprising:
   entering, by the processor, into a power saving mode except for the predetermined occasions in an event that the WUI is not received.

6. The method of claim 1, wherein the BA window comprises a discontinuous reception (DRX) on duration.

7. The method of claim 1, further comprising:
   considering, by the processor, the WUI within the BA window as valid,
   wherein the monitoring of the WUI comprises monitoring the WUI within the BA window.

8. The method of claim 1, further comprising:
   considering, by the processor, the WUI precedent to the BA window as valid,
   wherein the monitoring of the WUI comprises monitoring the WUI precedent to the BA window.

9. An apparatus, comprising:
   a transceiver which, during operation, wirelessly communicates with a network node of a wireless network; and
   a processor communicatively coupled to the transceiver such that, during operation, the processor performs operations comprising:
   receiving, via the transceiver, a configuration to monitor a wake-up indication (WUI) on predetermined occasions, the configuration also configuring a background activity (BA) window during which background link maintenance is performed by the apparatus;
   monitoring, via the transceiver, the WUI according to the configuration;
   determining whether the WUI is received;
   monitoring, via the transceiver, a physical downlink control channel (PDCCH) in an event that the WUI is received; and
   performing a link maintenance activity during the BA window,
   wherein the link maintenance activity comprises at least one of a channel state information (CSI) reference signal acquisition, CSI reporting, a sounding reference signal (SRS) transmission, a beam management measurement, beam management reporting, a radio link monitoring (RLM), a radio resource management (RRM), and monitoring a subset of configured search spaces, control resource sets (CORESETs), or downlink control information (DCI) formats on the PDCCH.

10. The apparatus of claim 9, wherein the WUI comprises at least one of a user equipment (UE)-specific physical signal, a group-common physical signal, a UE-specific downlink control information (DCI), and a group-common DCI.

11. The apparatus of claim 9, wherein the BA window is collocated with a synchronization signal block (SSB)-based radio resource management (RRM) measurement time configuration (SMTC) RRM configuration or with the tracking reference signal (TRS) in order to reduce power consumption by the apparatus.

12. The apparatus of claim 9, wherein, during operation, the processor further performs operations comprising:
    cancelling the monitoring of the PDCCH in an event that the WUI is not received.

13. The apparatus of claim 9, wherein, during operation, the processor further performs operations comprising:
    entering into a power saving mode except for the predetermined occasions in an event that the WUI is not received.

14. The apparatus of claim 9, wherein the BA window comprises a discontinuous reception (DRX) on duration.

15. The apparatus of claim 9, wherein, during operation, the processor further performs operations comprising:
    considering the WUI within the BA window as valid,
    wherein, in monitoring the WUI, the processor monitors the WUI within the BA window.

16. The apparatus of claim 9, wherein, during operation, the processor further performs operations comprising:
    considering the WUI precedent to the BA window as valid,
    wherein, in monitoring the WUI, the processor monitors the WUI precedent to the BA window.

* * * * *